Figure 1:
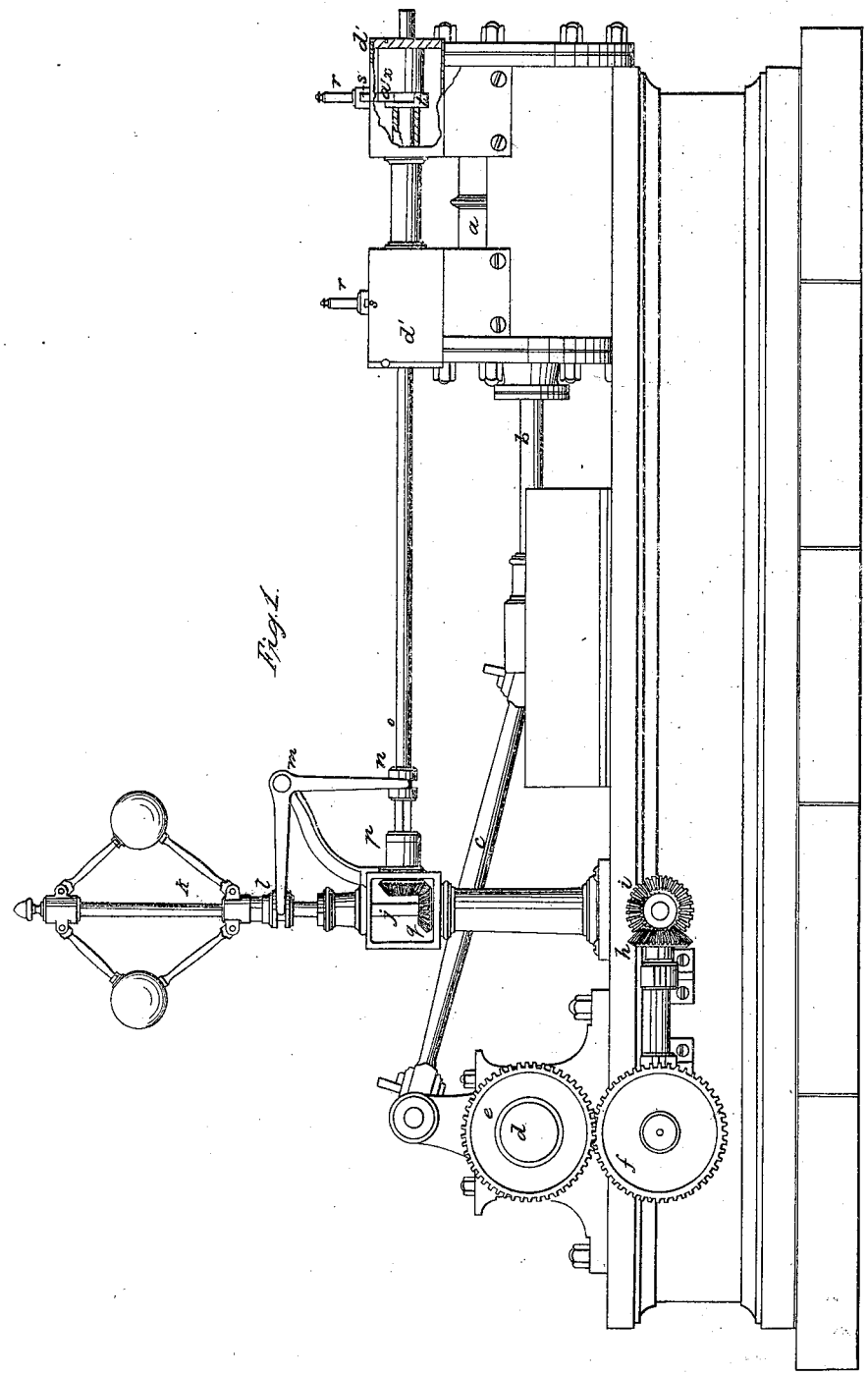

W. WRIGHT.
SELF ADJUSTING CUT OFF.

No. 10,398. Patented Jan. 3, 1854.

2 Sheets—Sheet 2.
W. WRIGHT.
SELF ADJUSTING CUT OFF.
No. 10,398. Patented Jan. 3, 1854.
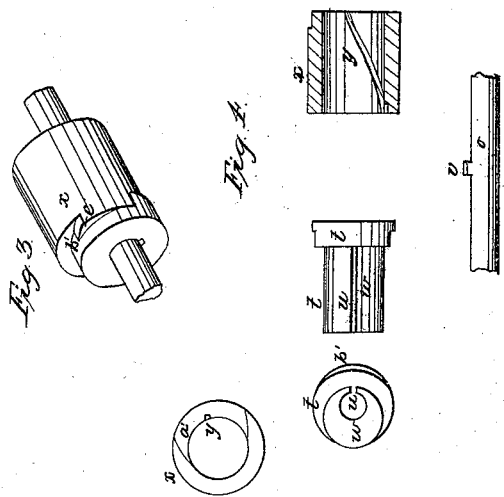
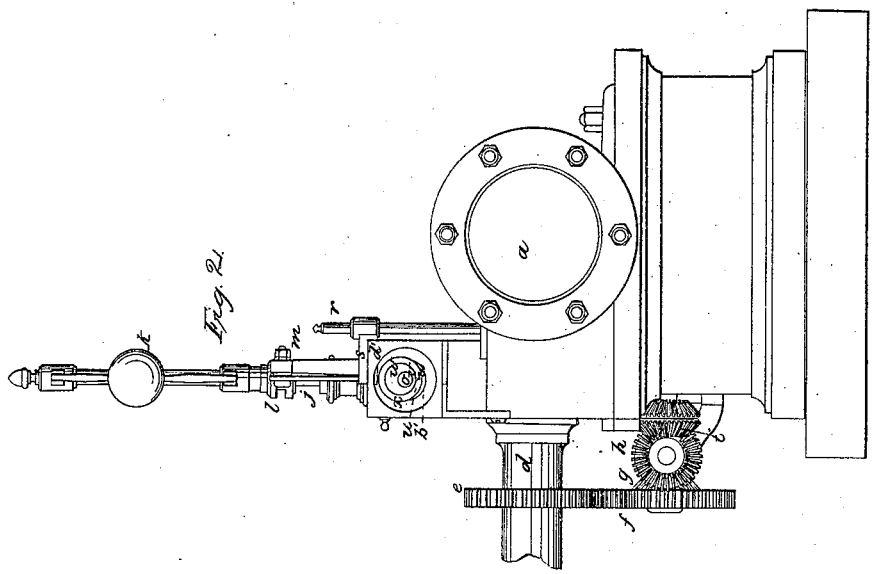

UNITED STATES PATENT OFFICE.

WILLIAM WRIGHT, OF HARTFORD, CONNECTICUT.

OPERATING CUT-OFF VALVES OF STEAM-ENGINES.

Specification of Letters Patent No. 10,398, dated January 3, 1854.

*To all whom it may concern:*

Be it known that I, WILLIAM WRIGHT, of Hartford, Connecticut, have invented certain new and useful Improvements in the Method of Operating the Cut-Off Valves of Steam-Engines, of which the following is a full, clear, and exact description, reference being had to the accompanying drawings, making part of this specification, in which—

Figure 1, is an elevation of an engine with my improved arrangement for operating the steam cut-off valves; Fig. 2, is an end elevation; Fig. 3, a perspective view of the cam; and Fig. 4, the parts thereof in detail; Figs. 3 and 4 being drawn on an enlarged scale.

The same letters indicate like parts in all the figures.

The object of my invention is to lift and let down the cut-off valves of steam engines by a gradual cam motion, which is adjustable at all times, to permit the valves to be closed at any desired part of the stroke of the piston, whether by a governor or by hand, and my said invention consists in the employment of a rotating concentric hub on the periphery of which the toes of the lifters rest when the valves are closed, when this is combined with a cam which turns eccentric to the hub, so that the said cam, for lifting and letting down the valves, shall project from the periphery of the said hub, and the most projecting part be adjustable to any part desired, to determine the period of closing the valves, the cam, at all times, starting from the same point on the periphery of the hub, that the period of opening the valve may always be the same during all the changes in the range of the cut-off. And my invention also consists in combining with the said hub and cam a sliding shaft or rod passing through them, and feathered to act on an oblique groove, or the equivalent therefor, on the cam to turn the said cam on the hub, whether the said slide be operated by hand or by its connection with the governor.

In the accompanying drawings $a$, represents the cylinder, $b$, the piston rod, and $c$, the connecting rod operating the crank shaft $d$, in the usual manner. On the crank shaft there is a cog wheel $e$, which communicates motion by a train of wheels $f$, $g$, $h$, $i$, to the vertical spindle $j$, which carries the ball governor $k$. The slide $l$, of the governor is connected with one arm of a right angle lever $m$, the other arm of which embraces a collar $n$, on a sliding rotating shaft $o$, one end of which is square, or round and feathered, to slide longitudinally in a hollow arbor $p$, which receives a rotary motion from a pair of bevel wheels $q$, $q$, from the spindle of the governor, and thereby imparts a rotary motion to the said shaft $o$, while at the same time it can be made to slide longitudinally in the hollow arbor $p$, by its connection with the slide of the ball governor by the interposed lever.

The stems $r$, $r$, of two puppet valves, of the usual construction, have toes $s$, $s$, which extend over the shaft $o$, which are lifted and let down at any desired portion of the stroke of the piston each by a cam of peculiar construction; and as the two are just alike, the description of one will suffice for both.

There is a hub $t$, through which the shaft $o$, slides, the hub having a longitudinal slot $u$, to receive a short feather $v$, on the shaft that the two may turn together. This hub is concentric and the enlarged part $t$, is of such diameter that when the toe of the valve stem rests on it, the valve is just on its seat. The other part $w$ of this hub is cylindrical, of a reduced diameter, and eccentric and to it is fitted a cylindrical sleeve $x$, of the diameter of the part $t$, of the hub, and adapted to turn thereon and is concentric therewith and hence eccentric to the hub $t$. The inner periphery of the sleeve is formed with an oblique groove $y$, to receive the feather $v$, of the shaft, which projects beyond the periphery of the part $w$, of the hub, so that when the shaft slides in the hub in one direction, the sleeve, by reason of the obliquity of the groove, will be turned in one direction, and vice versa.

A portion of the sleeve $x$, at one end $a'$, is eccentric so as to be concentric or nearly so, with the hub $t$, in one position and the said hub is formed with a lip or projection $b'$ extending over that portion $a'$ of the sleeve, the inner periphery of this projection being eccentric to the periphery of the hub, and concentric with the periphery of the sleeve, that part of the sleeve being made just to fit inside of the lip or projection of the hub.

The sleeve and hub being of equal diameter, and concentric to each other, and a part of the circumference of the sleeve being reduced so as to be concentric or nearly so with the hub which forms a portion of its circumference where it extends over it, the consequence will be that when the sleeve is so turned that the eccentric part of the sleeve forms a continuation of the periphery of the hub, the rotation of the shaft *o*, and hub will not lift the valve and hence steam will not be admitted; but when the sleeve is made to turn on the hub *t*, by the sliding of the shaft *o*, a portion of the periphery of the sleeve at *c'*, will project beyond the periphery of the hub in the form of a cam gradually returning to the periphery of the hub, as represented at Fig. 3, so that by the sliding of the shaft, this cam formed projection can be increased and decreased at pleasure to act upon the toe of the valve stem to lift and let down the valve by the rotation of the shaft and hub, thus determining the part of the stroke at which the valve shall be let down to cut off the steam, for it will be seen that the more the sleeve is turned on the hub, the greater will be the extent of the cam formed projection, notwithstanding the point at which it begins to act on the toe to lift the valve will always be at the same part of the periphery of the hub. In this way by simply sliding the shaft *o*, the period of closing the valves can be changed so as to cut-off longer or shorter, and as the shaft *o*, is connected with the balls of the governor, the period of closing the valves will be determined by the velocity of the engine, cutting off short when the engine moves fast, and cutting off long when the engine moves slow, and so on in any intermediate degree. There are two such formed cams, one for each steam valve, and each is inclosed in a case *d'* the ends of which keep the hub and sleeve *x*, together, and retain them in their proper places under the toes; as the shaft is made to slide longitudinally to regulate the position of the cams.

I do not wish to limit myself to the use of the adjusting cams in connection with the fly-ball governor, as the position of the shaft can be regulated by hand or by any other kind of governor. Nor do I wish to be understood as limiting myself to the employment of my invention for operating puppet valves, as other valves, whether sliding or otherwise, may be operated by the same means. Nor do I wish to limit myself to the special construction of the parts so long as the same end is attained by the mere substitution of equivalents.

I am aware that the cut-off-valves of steam engines have been operated by cams made in a helical form to vary the period of closing by sliding the cam endwise, and therefore I do not claim broadly the use of a shifting cam for this purpose.

What I claim as my invention and desire to secure by Letters Patent is—

1. The employment of a rotating concentric hub, on which the toes (or their equivalents) of the lifters, rest when the valves are closed, substantially as specified, when this is combined with a cam connected therewith, and which turns eccentrically thereon, for the purpose of opening and closing the valve and regulating the period of closing the same, substantially as specified.

2. And I also claim combining with the said hub and cam, a slide within them and acting on an oblique groove within the cam and a straight slot in the hub, substantially as specified, to determine the period of closing the valve, while the period of opening remains the same, as specified, and this I claim whether the said slide be operated by a governor or by other means.

WM. WRIGHT.

Witnesses:
 WM. H. BISHOP,
 CHAS. W. BAMBURGH.